(12) United States Patent
Kim et al.

(10) Patent No.: US 12,468,140 B2
(45) Date of Patent: Nov. 11, 2025

(54) OBSERVATION APPARATUS FOR CHANGING OBSERVATION DIRECTION BY CONTROLLING MOVING OBJECT WHICH MOVES ON PLANE COORDINATES

(71) Applicant: SL LAB, INC., Yongin-si (KR)

(72) Inventors: Jeong Hyun Kim, Seoul (KR); Ho Jin, Yongin-si (KR); Sun A Kang, Yongin-si (KR); Yun U Kim, Hanam-si (KR)

(73) Assignee: SL LAB, INC., Yongin-si (KR)

( * ) Notice: Subject to any disclaimer, the term of this patent is extended or adjusted under 35 U.S.C. 154(b) by 254 days.

(21) Appl. No.: 18/277,400

(22) PCT Filed: May 11, 2022

(86) PCT No.: PCT/KR2022/006714
§ 371 (c)(1),
(2) Date: Aug. 16, 2023

(87) PCT Pub. No.: WO2022/240171
PCT Pub. Date: Nov. 17, 2022

(65) Prior Publication Data
US 2024/0126066 A1   Apr. 18, 2024

(30) Foreign Application Priority Data
May 11, 2021   (KR) .................. 10-2021-0060815

(51) Int. Cl.
G02B 23/16   (2006.01)
F16M 11/20   (2006.01)
G02B 23/02   (2006.01)

(52) U.S. Cl.
CPC .......... *G02B 23/16* (2013.01); *F16M 11/2021* (2013.01); *F16M 11/2085* (2013.01); *F16M 11/2092* (2013.01); *G02B 23/02* (2013.01)

(58) Field of Classification Search
CPC .............................. G02B 23/165; F16M 11/14
See application file for complete search history.

(56) References Cited

FOREIGN PATENT DOCUMENTS

| CN | 103075625 A | * | 5/2013 |
|---|---|---|---|
| CN | 210465849 U | | 5/2020 |
| KR | 10-1349384 B1 | | 1/2014 |
| KR | 10-1358307 B1 | | 2/2014 |
| KR | 10-1513199 B1 | | 4/2015 |
| KR | 10-2085594 B1 | | 3/2020 |

OTHER PUBLICATIONS

International Search Report for PCT/KR2022/006714 mailed Jul. 21, 2022 from Korean Intellectual Property Office.

\* cited by examiner

*Primary Examiner* — Alexander P Gross
(74) *Attorney, Agent, or Firm* — Revolution IP, PLLC

(57) ABSTRACT

The present invention relates to an observation apparatus which changes and moves planar position coordinates of a moving object connected to an observation unit, so as to adjust an observation direction of the observation unit and a change speed of the observation direction, such that objects moving at low to high speeds can be tracked and observed, and objects in the celestial direction can be observed.

7 Claims, 4 Drawing Sheets

【Figure 1】
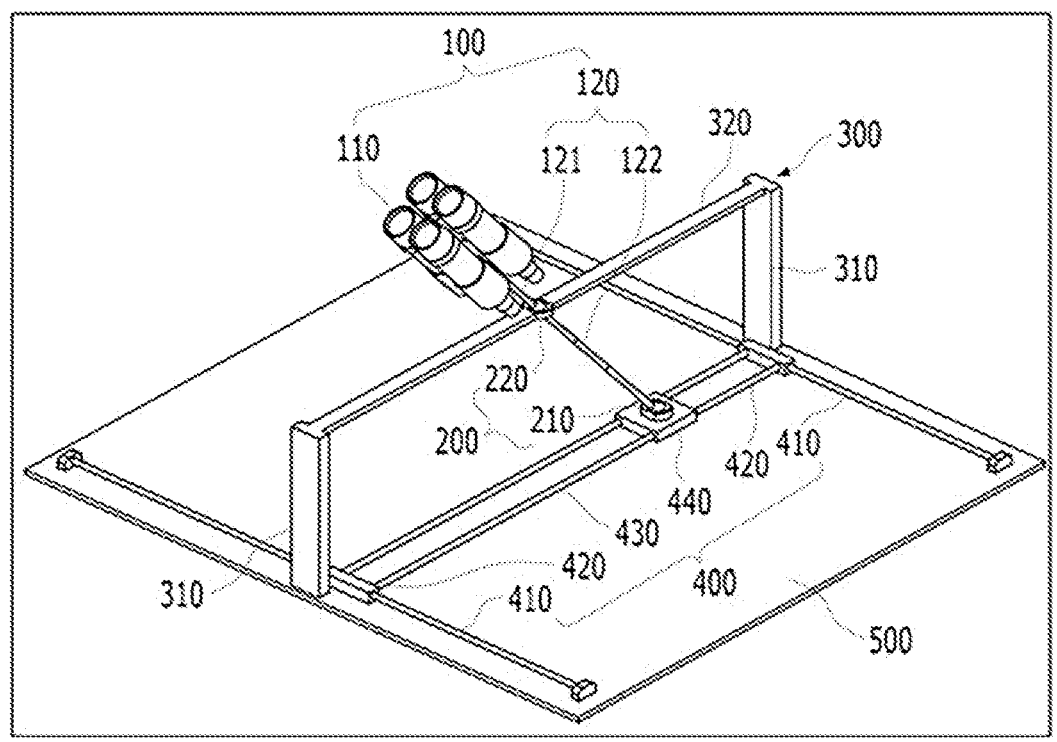

[Figure 2]
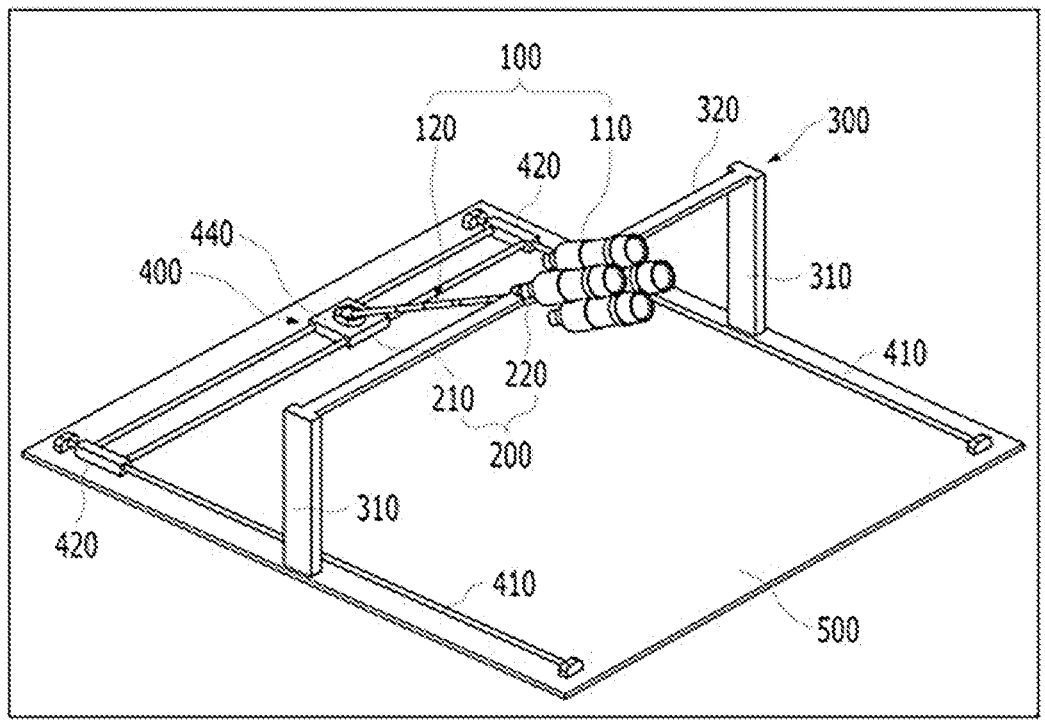

【Figure 3】
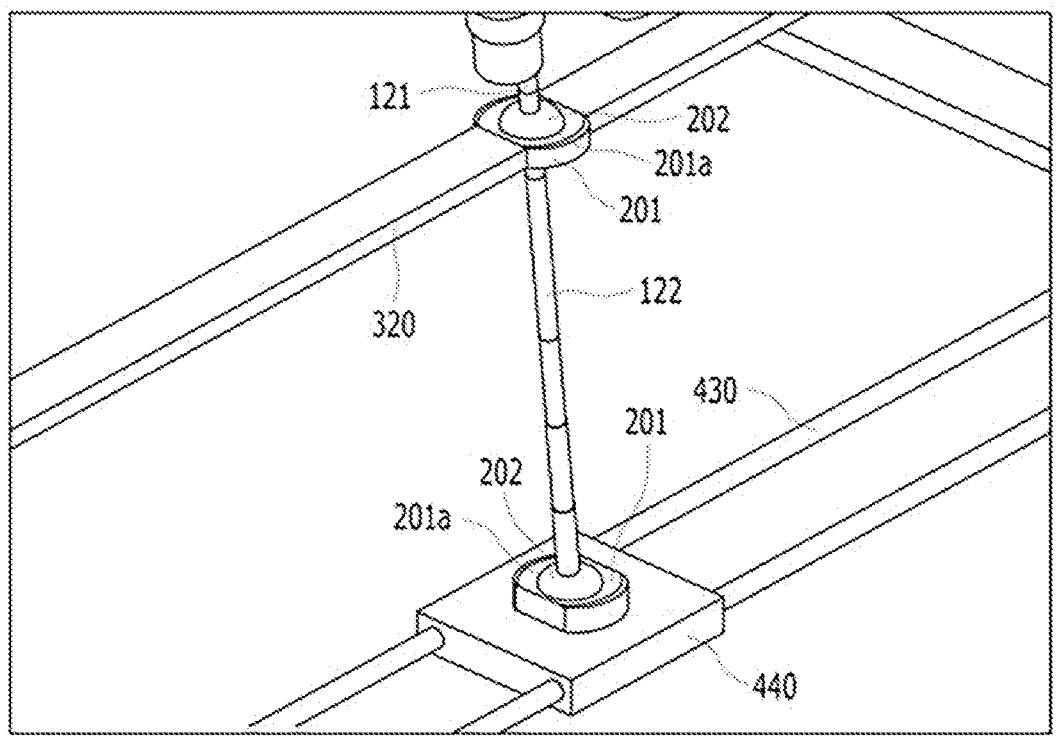

[Figure 4]
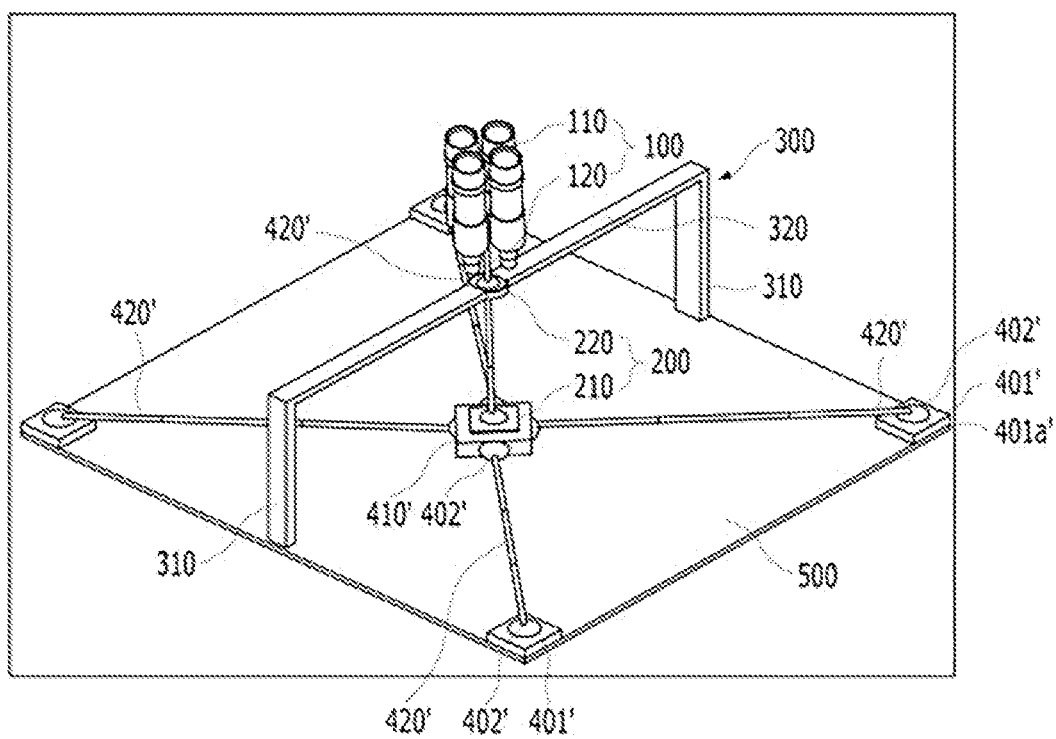

OBSERVATION APPARATUS FOR CHANGING OBSERVATION DIRECTION BY CONTROLLING MOVING OBJECT WHICH MOVES ON PLANE COORDINATES

TECHNICAL FIELD

The present invention relates to an observation apparatus for tracking or observing a moving observation target in space, in the atmosphere, or on the ground.

BACKGROUND ART

A telescope is a device that observes objects by receiving electromagnetic waves such as visible rays, infrared rays, ultraviolet rays, X-rays, and radio waves emitted or reflected from objects using optical devices such as lenses or mirrors. The telescope is classified into an optical telescope, a radio telescope, etc., according to received electromagnetic waves. In general, the telescope often refers to an optical telescope that sees visible light, and is a name that is used interchangeably with a telescope (optical tube).

Telescopes are generally used in astronomy to observe specific objects in space or the atmosphere. Recently, a mount structure that controls a telescope is useful for controlling the observation apparatus, and the range of use of the mount structure is expanding, such as being attached to a military tracking device or a communication antenna for tracking missiles and to a lower portion of a drone or a lower portion of observation airship for tracking ground objects.

The altazimuth mount refers to a structure for observing celestial bodies by adjusting an azimuth and an altitude. The altazimuth mount has the advantage of intuitive operation in that it is stably fixed on the ground without any special initial setting and only needs to adjust the azimuth and altitude angles to point the telescope to be directed to an observation target. However, since a celestial sphere is rotated due to an earth's rotation, it is cumbersome that the altitude and orientation of the celestial body need to be continuously changed. In particular, since the observation direction is set by angles such as altitude angle and azimuth, there is a structural limitation that observation is difficult near the celestial sphere where the altitude angle is 90°.

An equatorial mount means a structure for observing celestial bodies by adjusting a right ascension and a declination axis. When a right ascension axis is set to be directed to a north pole of the celestial sphere during observation, continuous measurement is possible in that observation may be made by rotating only a lens barrel in accordance with a diurnal motion of stars. As the right ascension axis does not point to the north pole of the celestial sphere, the equatorial mount has a structural limitation that causes observation errors, so it is not easy for beginners to set the equatorial mount initially. In addition, a weight is necessarily installed to compensate for a weight of an observation mirror, which makes the equipment heavy and bulky.

Both the altazimuth mount and the equatorial mount have a structure in which an observation mirror is installed on the mount, and there are restrictions that require a location or environment in which the mount may be stably installed. In addition, the altazimuth mount and the equatorial mount have a structure in which it is difficult to change the observation direction of the observer at high speed to track high-speed moving objects such as airplanes, drones, and missiles other than the observation of the celestial body.

DISCLOSURE

Technical Problem

The present invention has been made to solve the above problems, and an object of the present invention provides an observation apparatus capable of precisely controlling an observation direction of an observation unit by changing positional coordinates of a moving object connected to the other end of an observation unit in order for a user to rotate the observation unit in a direction in which he/she is looking at an objection object and capable of controlling a change speed of a observation direction of the observation unit by controlling a moving speed of the moving object. The present invention is not limited to the technical problem as described above, and another technical problem may be derived from the following description.

Technical Solution

According to an aspect of the present disclosure, an observation apparatus installed on a base includes: an observation unit having an observation mirror installed at one end and a rod-shaped rotation moving shaft coupled to the other end to be directed to the base; a rotating unit having a reference moving part coupled to the other end of the rotation moving shaft and a rotation center coupled to a set point of the rotation moving shaft; a support unit connected to the base on a plane at a predetermined height and rotatably coupled to the rotation center; and a moving unit disposed on the support unit, and to which the reference moving part is coupled to coordinate move on the plane, in which the rotation moving shaft is rotated based on the rotation center according to the coordinate movement of the moving unit to change an observation direction of the observation unit.

The rotation moving shaft may include: a fixed length shaft end connecting the observation unit and the rotation center and maintaining a set length; and a multi-stage length adjusting shaft end connecting the rotation center and the reference moving part, and the length adjusting shaft end may be folded according to the coordinate movement of the moving unit to increase or decrease a length.

The support unit may include: a plurality of vertical supports erected vertically at a set height on both sides of an upper portion of the base; and a horizontal support formed between a pair of vertical supports facing each other and having the rotation center installed at a center thereof.

The rotating unit may include: a rotating guide plate formed of a plate having a predetermined thickness and having a recessed groove concavely recessed in an upper portion; and a rotating sphere having the rotation moving shaft coupled to both ends thereof, and inserted into the recessed groove of the rotating guide plate to rotate according to the movement of the rotation moving shaft.

The moving unit may include: y rod shafts installed in a y-axis direction on both sides of the upper portion of the base; y moving objects each installed on the y rod shaft and moving simultaneously in the y-axis direction; an x rod shaft having both ends each connected to the y moving object and installed in the x-axis direction; and an x moving object installed on the x rod shaft, moving in the x-axis direction, and having the reference moving part coupled to an upper surface thereof, and the observation direction of the observation unit may be changed by the movement of the x moving object moving along the x rod shaft and the y moving object moving along the y rod shaft.

The moving unit may include: a moving object formed of a polyhedron and coupled to a lower portion of the reference moving part; and a plurality of rotation moving shaft having one end coupled to any one of side surfaces of the moving object and each other end coupled to a plurality of points of the base, and each is composed of multiple stages and a length is adjusted in a folding manner.

The observation apparatus may further include: rotating guide plates disposed at both ends of the rotation moving shaft and having a recessed groove formed therein; and a rotating sphere having the rotation moving shaft coupled to both ends thereof, and inserted into the recessed groove of the rotating guide plate to rotate according to the movement of the rotation moving shaft.

Advantageous Effects

By coupling an end of a rotation moving shaft to a moving unit that moves on a plane in a state in which the rotation moving shaft of an observation unit is fixed at a predetermined height of a support unit, it is possible to change an observation direction of an observation mirror according to the movement of the mobile unit, and control a change speed of the observation direction through the speed control of the mobile unit. In particular, the overall volume of the present invention is significantly reduced compared to the existing observation apparatus, and the versatility of the installation environment is improved because the present invention does not require a mount such as an altazimuth mount or an equatorial mount. In addition, the existing observation apparatus was difficult to observe around a celestial sphere in that the observation direction is controlled by an angle, but the present invention has the advantage of being able to observe around the celestial sphere only by setting plane coordinates of a moving unit.

In addition, since the rotation moving shaft is configured to have a fixed length shaft end and a variable length adjusting shaft end, it is possible to observe a target object in a state in a height of an observation mirror is maintained despite the movement of the moving unit on a plane.

In addition, the support unit is configured to have a vertical support having a predetermined height and a horizontal support to which a rotation center is coupled to distribute a load of the observation mirror to the support unit, so an observation operation can be performed while maintaining a stable posture during observation.

In addition, since a rotating unit is configured to have a reference moving part coupled to the other end of the rotation moving shaft and the rotation center where the rotation is coupled to a coaxial set point, it is possible to rotate the observation mirror without shaking while the height of the rotation center is maintained when changing the observation direction.

In addition, since a rotating sphere coupled to an end of the rotating shaft is inserted into a recessed groove of a rotating guide plate, it is possible to stably change the rotation moving shaft in length without being separated when the moving object moves one the plane.

In addition, since an x moving object moves in x and y-axis directions by a y rod shaft and an x rod shaft of the moving unit, it is possible to precisely control the observation direction of the observation mirror only by setting values of positional coordinates of x and y on the plane.

In addition, since the rotation moving shaft is coupled to each surface of a moving object of a polyhedron, and is coupled to multiple points of a base, it is possible to easily move the rotation moving shaft in a diagonal direction in addition to an x-y 2-axis direction by adjusting the angle and length of the rotation moving shaft.

DESCRIPTION OF DRAWINGS

FIG. 1 is a block configuration diagram of an observation apparatus that changes an observation direction by controlling a moving object moving on plane coordinates according to an embodiment of the present invention.

FIG. 2 is an operating state diagram of a moving unit illustrated in FIG. 1.

FIG. 3 is a partially enlarged view of a rotating unit illustrated in FIG. 1.

FIG. 4 is a block configuration diagram of an observation apparatus capable of coordinate movement control according to another embodiment of the present invention.

MODE FOR INVENTION

Hereinafter, embodiments of the present invention will be described in detail with reference to the accompanying drawings. Unlike the conventional telescope that is installed on a mount and whose angle is controlled, an embodiment described below relates to an observation apparatus that can be installed in various places according to the purpose of observation, in which the observation apparatus has a structure that an observation direction of an observation mirror changes through control of a moving object that moves on plane coordinates in x and y-axis directions. Hereinafter, the observation apparatus that changes the observation direction through control of a moving object moving on plane coordinates will be briefly referred to as an 'observation apparatus'.

FIG. 1 is a block configuration diagram of an observation apparatus that changes an observation direction by controlling a moving object moving on plane coordinates according to an embodiment of the present invention, FIG. 2 is an operating state diagram in which the observation unit is rotated by operating a moving unit illustrated in FIG. 1, and FIG. 3 is a partially enlarged view illustrating a configuration of a rotating unit illustrated in FIG. 1. Referring to FIGS. 1 to 3, the observation apparatus according to this embodiment includes an observation unit 100, a rotating unit 200, a support unit 300, a moving unit 400, and a base 500, and may be precisely controlled by an electronic control unit. Since the control unit has a conventional configuration, an operation method or a connection method will be omitted. Here, the base 500 means a general flat plate on which the observation apparatus is installed, and may mean the ground, a bottom surface of a steel plate, a lower surface of an observation airship, or a front surface of a helicopter. For convenience of description, the base 500 is illustrated and described as being placed on the lower side of the drawing.

In this embodiment, it can be installed parallel to the bottom surface as well as installed on a lower portion of an air vehicle such as a drone or a helicopter and used for ground observation. Alternatively, it may be installed on an upper portion or front of the vehicle and rotated toward an observation target. Here, in the observation apparatus, the other end of a rotation moving shaft 120 moves to coordinates set on the x and y positions of the base 500, so that the observation direction of the observation mirror 110 may be precisely changed.

In addition, since the observation apparatus of this embodiment controls the observation mirror 110 to be precisely rotated by coordinate movement on a plane, observation is possible to a celestial sphere side, and objects passing by a celestial sphere side may be tracked and observed. In particular, since a weight is not required due to a support unit 300 supporting a load of the observation mirror 110, the overall volume and weight of the observation apparatus may be reduced and the installation range may be widened.

The observation unit 100 is an observation unit that is arranged toward the observation target to transmit and receive images of the observation target. The observation unit 100 has the observation mirror 110 installed at one end and a rod-shaped rotation moving shaft 120 coupled to the other end to be directed to the base 500. The observation mirror 110 may be an optical device that enlarges and looks as an observation target or may be a lens, or a telescope, an antenna, or a laser receiver for detecting optical data. As illustrated in FIG. 1, a plurality of observation mirrors 110 may be installed and may be variously applied depending on the type.

The rotation moving shaft 120 has one end provided with an observation mirror 110, and the other end disposed toward the base 500, and becomes reference central shaft around which the observation mirror 110 is rotated. In this case, the rotation moving shaft 120 is composed of multiple stages and is equipped to adjust the length, and a set point of the rotation moving shaft 120 is connected and fixed to the support unit 300 to be rotated in a stable posture around the set point. In this way, the rotation moving shaft 120 is rotated around the set point of the rotation moving shaft 120 according to the position movement of the other end, and the position of the observation mirror 110 may be changed by the rotation of the rotation moving shaft 120.

The rotating unit 200 is a component coupled to the rotation moving shaft 120 of the observation unit 100. The rotating unit 200 is configured to have a reference moving part 210 coupled to the other end of the rotation moving shaft 120 and a rotation center 220 coupled to a set point of the rotation moving shaft 120. Specifically, the reference moving part 210 is installed in an upper portion of an x moving object 440 of the moving unit 400 to be described later, and rotates the rotation moving shaft 120 while moving along an operating direction of the moving unit 400. In addition, the rotation center 220 is disposed at the set point of the rotation moving shaft 120 and is installed in a center of a horizontal support 320 of the support unit 300, and the rotation moving shaft 120 may be rotated while the position of the rotation center 220 is fixed to the horizontal support 320.

Such a rotating unit 200 may have a rotating guide plate 201 formed of a flat plate having a set thickness, and a rotating sphere 202 in which a rotation moving shaft 120 is connected and fixed to rotate. The rotating guide plate 201 may be placed on an xy plane in a horizontal direction and connected to the support unit 300 and the moving unit 400, respectively. The rotating guide plate 201 has a spherical recessed groove 201a formed therein to induce the rotation of the rotating sphere 202 inserted therein. As illustrated in FIG. 3, the rotating sphere 202 is inserted into the recessed groove 201a of the rotating guide plate 201 installed in the support unit 300 and the moving unit 400 so that the penetrating rotation moving shaft 120 may be rotated.

In particular, the rotation moving shaft 120 is configured to have a fixed length shaft end 121 formed in a rod shape and a variable length adjusting shaft end 122. Specifically, the fixed length shaft end 121 connects the observation unit 110 and the rotation center 220 and maintains the set length even when the observation direction of the observation unit 100 is changed. The length adjusting shaft end 122 connects the rotation center 220 and the reference moving part 210 and is formed in multi-stage, and thus, is variable in length when the observation direction of the observation unit 100 is changed.

The length of the fixed length shaft end 121 may be adjusted so that a user may set a rotation radius of the observation mirror 110 according to the observation target or use environment, and may be equipped with a fixing means so that the fixed length shaft end 121 may be maintained at a set length. In addition, the length adjusting shaft end 122 may be changed to increase or decrease in length so that a vertical height of the length adjusting shaft end 122 from the bottom surface is maintained constant as the position of the other end of the rotation moving shaft 120 is moved according to the operating direction of the moving unit 400.

The rotation moving shaft 120 is a means for a user to change the angle of the observation mirror 110 to the position of the observation target. When the user sets the position of the other end of the rotation moving shaft 120, the rotation moving shaft 120 rotates and moves the observation mirror 110 in a radius of a set distance of the fixed length shaft end 121 while the length of the length adjusting shaft end 122 is automatically changed as the other end of the rotation moving shaft 120 is moved by the operation of the moving unit 400.

The support unit 300 is connected to both sides of the upper portion of the base 500 at a predetermined height so that the rotation center 220 is rotatably coupled, and is a means for supporting the rotation moving shaft 120 to rotate in a stable posture. Specifically, the support unit 300 is configured to have a plurality of vertical supports 310 erected vertically at a set height on both sides of the upper portion of the base 500 and a horizontal support 320 formed between a pair of vertical supports 310 facing each other and provided with a rotation center 220 installed in the center.

The support unit 300 is composed of a certain thickness and material to withstand the load of the observation unit 100, and in particular, it is preferable that the horizontal support 320 has a set width of a size that accommodates the rotating sphere 202 so that the rotation center 220 may be installed at a center thereof.

The moving unit 400 is a means for moving the reference moving part 210 installed at the other end of the rotation moving shaft 120 in the x and y directions in order to change the observation direction of the observation mirror 110. In detail, the moving unit 400 may include a y rod shaft 410 installed in the y-axis direction, a y moving object 420 installed on the y rod shaft and moved, an x rod shaft 430 installed in the x-axis direction, and an x moving object 440 installed on the x rod shaft and moved. The moving unit 400 may be operated by setting x and y positional coordinates of the reference moving part 210 so that the observation mirror 110 is directed to the observation direction that a user wants to change.

The y load shaft 410 may be installed parallel to the y-axis direction on both sides of the upper portion of the base 500, and may be configured to have a cylinder shaft, a slide bar, or a ball screw to minimize frictional force during the transfer of the y moving object 420. In addition, the y moving objects 420 are disposed symmetrically on both sides of the y rod shaft 410, respectively, and simultaneously move in the forward and backward directions of the y axis from both sides according to the operating direction of the y rod shaft 410. Both ends of the x rod shaft 430 are each connected to the y moving object 420 and installed in the x-axis direction, and have the same structure as the y rod shaft 410 to facilitate the transfer of the x moving object 440.

The x moving object 440 is disposed on the x rod shaft 430 and moves to the left and right of the x axis according to the operating direction of the x rod shaft 430, and has the reference moving part coupled to the upper surface thereof so that the position of the other end of the rotation moving shaft 120 is changed by the driving of the y rod shaft 410 and the x rod shaft 430.

That is, the x moving object 440 is moved by driving the y rod shaft 410 and the x rod shaft 430 on the horizontal surface of the base 500 so that the x moving object 440 may be moved by calculating the x, y positional coordinates of the x moving object 440 for the observation direction in which the user intends to arrange the observation mirror 110. In addition, as the rotation moving shaft 120 is rotated based on the rotation center 220 according to the operating direction of the moving unit 400, the observation direction of the observation mirror 110 may be changed.

In addition, the x moving object 440 is equipped to be moved in the x and y-axis directions by the y rod shaft 410 and the x rod shaft 430 of the moving unit 400, and thus, may be precisely controlled by calculating the x and y positional coordinates of the x moving object 440 so that the observation mirror 110 is rotated toward the observation target.

The control unit is a means for controlling the operation of the moving unit 400, and controls the operation of the y rod shaft 410 and the x rod shaft 430 with the set positional coordinates of the x moving object 440. The control unit precisely controls the position of the other end of the rotation moving shaft 120 according to the setting of the positional coordinates, and rotates the rotation moving shaft 120 around the rotation center 220 according to the movement of the x moving object 440 by the driving of the moving unit 400 to change the direction of the observation mirror 110.

FIG. 4 is a block configuration diagram of an observation apparatus capable of coordinate movement control according to another embodiment of the present invention. An observation apparatus according to another embodiment of the present invention is an embodiment in which the structure of the moving unit is different from that of FIG. 1, and has the structure in which the observation unit 100, the rotating unit 200, and the support unit 300 are the same.

A moving unit 400' is a means for moving the reference moving part 210 installed at the other end of the rotation moving shaft 120 in the x and y directions in order to change the observation direction of the observation mirror 110. The moving unit 400' is disposed on the support unit 300 and is rotatably coupled to the reference moving part 210. In detail, the moving unit 400' may be provided with a moving object 410' disposed at the other end of the rotation moving shaft 120 and a plurality of rotation moving shafts 420' that move the moving object 410' on a horizontal plane with set positional coordinates.

The moving object 410' is formed of polyhedron having a predetermined thickness and coupled to the lower portion of the reference moving part 210. Typically, the moving object 410' may be composed of a hexahedron of a rectangular plate. In this case, the moving object 410' has the same coupling structure as the reference moving part 210 as in FIG. 1, but has a structure provided with a rotating sphere 402' connected to the rotation moving shaft 420' on the side. In addition, the rotation moving shaft 420' has one end coupled to any one of the four sides of the moving object 410' and the other end coupled to the base 500, and is composed of multiple stages, and the length of the rotation moving shaft 420' is adjusted according to the position change of the moving object 410'. In this case, the rotation moving shaft 420' may move the position of the moving object 410' while the length is changed according to the set positional coordinates of the moving object 410'.

In addition, the moving unit 400 may be provided with rotating guide plates 401' disposed at both ends of the rotation moving shaft 420' and having a spherical recessed groove 401a' formed therein, and a rotating sphere 402' inserted into a recessed groove 401a' of the rotating guide plate 401' and rotated according to the movement of the rotation moving shaft 410'. In this case, as illustrated in FIG. 4, the rotating guide plate 401' may be formed in a spherical shape on the side of the moving object 410' and provided with a recessed groove 401a' into which a rotating sphere 402' is inserted. In addition, the rotating guide plates 401 are fixedly installed on edges of the base 500 so that the moving object 410' may move stably without shaking.

By changing the positional coordinates of the x moving object 440 connected to the other end of the observation mirror 110 in the x and y directions in order to rotate the observation mirror 110 in the direction in which the user looks at the observation target, it is possible to precisely control the position of the observation mirror 110, improve the accuracy of the observation position for the observation target, and improve workability.

In addition, the moving object 410' of the moving unit 400 is moved to the x and y positional coordinates on the plane by the plurality of rotation moving shafts 420' each coupled to the edges of the base 500 to track the observation target in real time, and the moving object 410' may be immediately moved to the x and y positional coordinates without moving twice in the x-axis and y-axis directions to shorten an initial setup time.

Hereinabove, the present invention has been described with reference to preferred embodiments thereof. It will be understood by those skilled in the art to which the present invention pertains that the present invention may be implemented in a modified form without departing from essential characteristics of the present invention. Therefore, exemplary embodiments disclosed herein should be considered in an illustrative aspect rather than a restrictive aspect. The scope of the present invention should be defined by the claims rather than the above-mentioned description, and all differences within the range equivalent to the claims should be interpreted to fall within the present invention.

The invention claimed is:

1. An observation apparatus installed on a base (500), comprising:
   an observation unit (100) having an observation mirror (110) installed at one end and a rod-shaped rotation moving shaft (120) coupled to the other end to be directed to the base (500);
   a rotating unit (200) having a reference moving part (210) coupled to the other end of the rotation moving shaft (120) and a rotation center (220) coupled to a set point of the rotation moving shaft (120);
   a support unit (300) connected to the base (500) on a plane at a predetermined height and rotatably coupled to the rotation center (220); and
   a moving unit (400) disposed on the support unit (300), and to which the reference moving part (210) is coupled to coordinate move on the plane,
   wherein the rotation moving shaft (120) is rotated based on the rotation center (220) according to the coordinate movement of the moving unit (400) to change an observation direction of the observation unit (110).

2. The observation apparatus of claim 1, wherein the rotation moving shaft (120) comprises:

a fixed length shaft end (121) connecting the observation unit (110) and the rotation center (220) and maintaining a set length; and a multi-stage length adjusting shaft end (122) connecting the rotation center (220) and the reference moving part (210), and the length adjusting shaft end (122) is folded according to the coordinate movement of the moving unit (400) to increase or decrease a length.

3. The observation apparatus of claim 1, wherein the support unit (300) comprises:

a plurality of vertical supports (310) erected vertically at a set height on both sides of an upper portion of the base (500); and a horizontal support (320) formed between a pair of vertical supports (310) facing each other and having the rotation center (220) installed at a center thereof.

4. The observation apparatus of claim 1, wherein the rotating unit (200) comprises:

a rotating guide plate (201) formed of a plate having a predetermined thickness and having a recessed groove (201a) concavely recessed in an upper portion; and a rotating sphere (202) having the rotation moving shaft (120) coupled to both ends thereof, and inserted into the recessed groove (201a) of the rotating guide plate (201) to rotate according to the movement of the rotation moving shaft (120).

5. The observation apparatus of claim 1, wherein the moving unit (400) comprises:

y rod shafts (410) installed in a y-axis direction on both sides of the upper portion of the base (500);

y moving objects (420) each installed on the y rod shaft (411) and moving simultaneously in the y-axis direction;

an x rod shaft (430) having both ends each connected to the y moving object (421) and installed in the x-axis direction; and an x moving object (440) installed on the x rod shaft (412), moving in the x-axis direction, and having the reference moving part (210) coupled to an upper surface thereof, and the observation direction of the observation unit (100) is changed by the movement of the x moving object (440) moving along the x rod shaft (430) and the y moving object (420) moving along the y rod shaft (410).

6. The observation apparatus of claim 1, wherein the moving unit (400) comprises:

a moving object (410') formed of a polyhedron and coupled to a lower portion of the reference moving part (201); and a plurality of rotation moving shaft (420') having one end coupled to any one of side surfaces of the moving object (410') and each other end coupled to a plurality of points of the base (500), and each composed of multiple stages and a length is adjusted in a folding manner.

7. The observation apparatus of claim 6, further comprising:

rotating guide plates (401') disposed at both ends of the rotation moving shaft (420') and having a recessed groove (401a') formed therein; and a rotating sphere (402') having the rotation moving shaft (420') coupled to both ends thereof, and inserted into the recessed groove (401a') of the rotating guide plate (401') to rotate according to the movement of the rotation moving shaft (410).

* * * * *